United States Patent
Knab et al.

(10) Patent No.: US 8,063,590 B2
(45) Date of Patent: Nov. 22, 2011

(54) METHOD AND APPARATUS FOR DETECTING BLOCKING OF A DIRECT CURRENT MOTOR

(75) Inventors: Norbert Knab, Appenweier (DE); Nikolas Haberl, Sinzheim (DE); Frank Fischer, Buehl Neusatz (DE); Joerg Eichhorn, Buehl (DE)

(73) Assignee: Robert Bosch GmbH, Stuttgart (DE)

(*) Notice: Subject to any disclaimer, the term of this patent is extended or adjusted under 35 U.S.C. 154(b) by 737 days.

(21) Appl. No.: 11/570,960

(22) PCT Filed: Jun. 1, 2005

(86) PCT No.: PCT/EP2005/052498
§ 371 (c)(1),
(2), (4) Date: Aug. 5, 2008

(87) PCT Pub. No.: WO2005/124960
PCT Pub. Date: Dec. 29, 2005

(65) Prior Publication Data
US 2008/0303461 A1 Dec. 11, 2008

(30) Foreign Application Priority Data
Jun. 22, 2004 (DE) .................. 10 2004 030 130

(51) Int. Cl.
*H02P 1/00* (2006.01)
(52) U.S. Cl. ......... 318/278; 318/434; 318/432; 318/430
(58) Field of Classification Search .................. 318/278, 318/430, 432, 434
See application file for complete search history.

(56) References Cited

U.S. PATENT DOCUMENTS

| 5,012,168 A | * | 4/1991 | Dara et al. ..................... 318/434 |
| 5,367,236 A | * | 11/1994 | Salazar .......................... 318/567 |
| 5,423,192 A | * | 6/1995 | Young et al. .................. 62/228.4 |
| 5,744,921 A | * | 4/1998 | Makaran .................. 318/400.34 |
| 6,163,129 A | * | 12/2000 | Younger et al. ............... 318/799 |
| 6,838,847 B2 | * | 1/2005 | Dragoi et al. ................. 318/434 |
| 2003/0210011 A1 | | 11/2003 | Dragoi et al. |

FOREIGN PATENT DOCUMENTS

| DE | 40 40 847 | 7/1992 |
| DE | 101 58 846 | 7/2003 |
| EP | 0 518 538 | 12/1992 |
| GB | 2 342 517 | 4/2000 |

* cited by examiner

*Primary Examiner* — Walter Benson
*Assistant Examiner* — David Luo
(74) *Attorney, Agent, or Firm* — Michael J. Striker

(57) ABSTRACT

Both a method and a use by this method of an apparatus for detecting blocking of a direct current motor (10), in particular a direct current motor (10) for a blower of a motor vehicle, is presented. The direct current motor (10) is deactivated by a computer unit (20) with the aid of a switching means (18) for a defined time period ($T_{off}$). Within the defined time period ($T_{off}$), at least one subsequent time ($t_a$, $t_b$), an induced voltage (U) of the direct current motor (10) is measured and forwarded to the computer unit (20). The direct current motor (10) remains deactivated if the induced voltage (U) undershoots a predetermined threshold value ($U_{th}$), or the direct current motor (10) is reactivated if the induced voltage (U) of the direct current motor (10) does not undershoot the predetermined threshold value ($U_{th}$).

16 Claims, 1 Drawing Sheet

METHOD AND APPARATUS FOR DETECTING BLOCKING OF A DIRECT CURRENT MOTOR

CROSS-REFERENCE

The invention described and claimed hereinbelow is also described in PCT/EP2005/052498, filed on Jun. 1, 2005 and DE 102004030130.1, filed on Jun. 22, 2004. This German Patent Application, whose subject matter is incorporated here by reference, provides the basis for a claim of priority of invention under 35 U.S.C. 119 (a)-(d).

BACKGROUND OF THE INVENTION

The invention relates both to a method and to a use by this method of an apparatus for detecting blocking of a direct current motor, in particular a direct current motor for a blower of a motor vehicle.

From German Patent Disclosure DE-A 40 40 847, a method for monitoring and triggering an electronically commutated direct current motor is known, in which the running of the motor is monitored by measuring, via a measuring resistor, a frequency and/or a voltage that corresponds to either the current picked up by the motor or the frequency. In the event of blocking or nonstandard running of the motor, an error signal is generated, which indicates an overshooting or undershooting of predetermined limit values on the part of the measured frequency or voltage. In order to achieve motor startup with high certainty even in the event of a tendency to blocking or with starting errors on the part of the motor, the motor is repeatedly switched off and on again if an error signal is present.

From European Patent Disclosure EP-A 0 518 538, a regulating system for an electrically commutated direct current motor of a breathing device is also known, with which the speed of the motor is monitored on the basis of the induced voltage (back EMF) generated by the motor. To that purpose, it is provided that the voltage supply to the motor be briefly interrupted at intervals. Moreover, the current of the motor is also monitored, by means of the voltage that drops across a resistor connected in series with the motor. From the monitored signals, a virtually constant flow of the breathing air can be assured by the regulating system even in the event of increasing blocking of the flow rate as a consequence of clogging air filters.

SUMMARY OF THE INVENTION

Compared to the prior art cited, the invention has the advantage that reliable detecting blocking of a direct current motor, with a blocking current that is relatively slightly above the maximum motor current that occurs, is assured even if current measurement that involves low tolerances with cost-intensive precision components, or calibrating them in a complicated way, cannot be assured or proves not to be assured. To that end, both a method and a use by this method of an apparatus for detecting blocking of a direct current motor, in particular a direct current motor for a blower of a motor vehicle, is contemplated in which the direct current motor is deactivated by a computer unit with the aid of a switching means for a defined time period. Within the defined time period, an induced voltage of the direct current motor is then measured at least one subsequent time and forwarded to the computer unit. If the measured, induced voltage undershoots a predetermined limit value, then the direct current motor remains deactivated. Conversely, if the predetermined limit value is not undershot by the induced voltage, then a reactivation of the direct current motor takes place.

In an advantageous feature of the invention, it is provided that after reactivation of the direct current motor, a measurement variable that is dependent on a motor current and is measured by means of a measuring device is forwarded to the computer unit and stored as a reference value in a memory of the computer unit. During the operation of the direct current motor, the measuring device now measures the measurement variable and compares it with the reference value previously stored in memory.

A further advantage is obtained if the direct current motor is deactivated again by the computer unit with the aid of the switching means for the defined time period as soon as the measured measurement variable deviates from the reference value stored beforehand in the memory of the computer unit by more than a definable tolerance value. Within the defined time period, at a subsequent time, the induced voltage of the direct current motor is then measured again and forwarded to the computer unit, and the direct current motor remains deactivated if the measured, induced voltage undershoots the predetermined threshold value. If a reactivation of the direct current motor occurs, the measuring operation described is repeated continuously, until such time as a final deactivation of the direct current motor is effected—for example by shut-off of the blower of the motor vehicle, or if blocking is detected. The method of the invention is thus especially suitable for use of the apparatus of the invention if tolerances pertaining to the maximum motor current and the minimum blocking current are relatively great, and furthermore the method of the invention does not require adaptation of the threshold value for various applications.

It is advantageously provided that the reference value stored in the memory of the computer unit is tracked as a function of an influencing variable—such as a motor supply voltage and/or an ambient temperature—affecting the motor current. It can thus be prevented that changes in the current which are caused by the supply voltage will cause unnecessary deactivation of the direct current motor for the defined time period and accordingly an unnecessary load on the computer unit and/or on the switching means.

BRIEF DESCRIPTION OF THE DRAWINGS

The invention is described below as examples on the basis of FIGS. 1 and 2. Shown are.

DETAILED DESCRIPTION OF THE PREFERRED EMBODIMENTS

Figure 1:
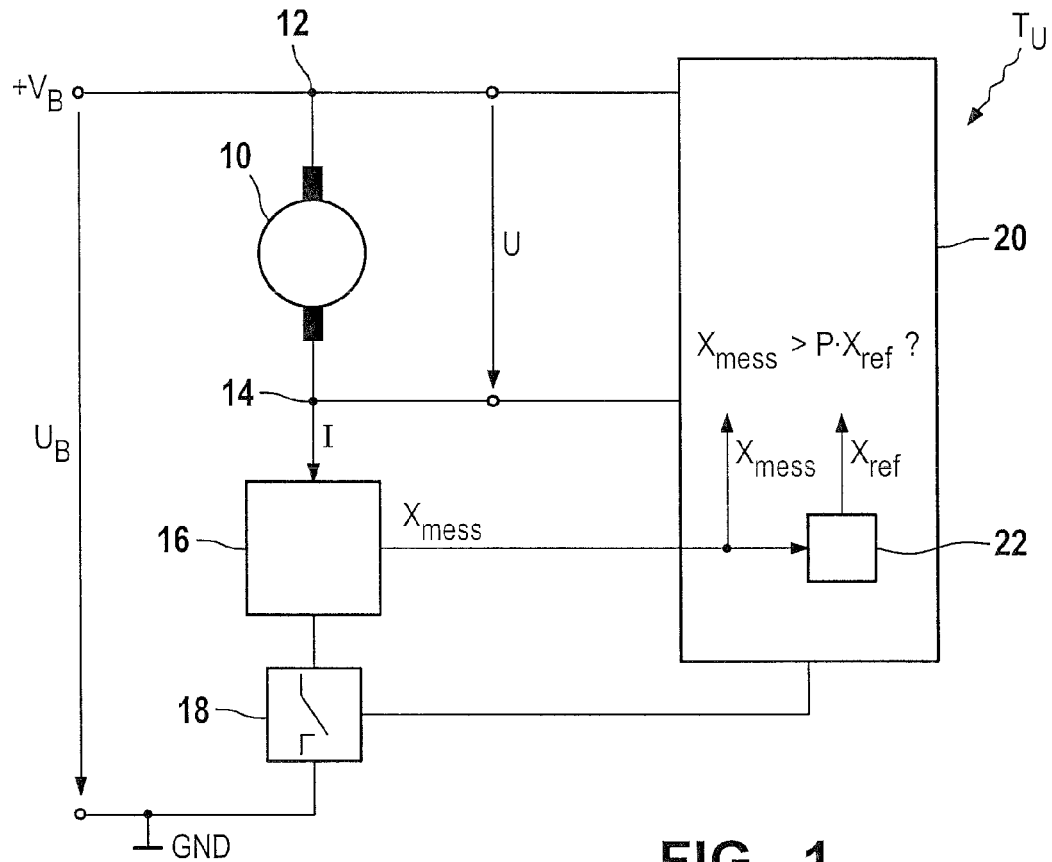
FIG. 1: a block circuit diagram of the apparatus of the invention for use of the method of the invention for detecting blocking of a direct current motor.

FIG. 1 shows a block circuit diagram of the apparatus of the invention for detecting blocking of a direct current motor 10; the direct current motor 10 may be a component of a blower, not shown, of a motor vehicle. Via a first contact point 12, the direct current motor 10 is on the one hand connected electrically conductively to a positive supply potential +VB. On the other, a connection of the direct current motor 10 also exists via a second contact point 14 via a measuring device 16 and a switching means 18, which latter is in turn connected directly to a ground potential GND. Thus over the entire series circuit, composed of the direct current motor 10, the measuring device 16 and the switching means 18, a motor supply voltage $U_B$ drops, which voltage is made available for instance by a battery, not shown, of the motor vehicle.

The measuring device 16 is embodied for instance in the form of a series resistor typically used in controlled direct current motors, and it furnishes a measurement variable $X_{mess}$ that corresponds to a motor current I, which in turn is proportional to the voltage dropping across the series resistor. Alternatively, the measuring device 16 may be realized by a conductor strip, shunt, current sensor, or the like; the measurement variable $X_{mess}$ need not necessarily correspond to the motor current I; instead, it may for instance be present directly as a voltage value. For the following description of the exemplary embodiment, however, it will be assumed that the measurement variable $X_{mess}$ does represent the motor current I. The switching means 18 typically comprises a MOSFET, but it may also be embodied as a bipolar transistor, relay, or the like.

Via the contact points 12 and 14, the direct current motor 10 is connected to a computer unit 20 for measuring an induced voltage U, which is generated by the direct current motor 10 and is directly proportional to the rpm of the direct current motor 10. The computer unit 20 is also connected to the measuring device 16 and the switching means 18, so that on the one hand the measurement variable $X_{mess}$ furnished by the measuring device 16 can be stored as a reference value $X_{ref}$ in a memory 22 of the computer unit 20, and on the other, an activation or deactivation of the direct current motor 10 by the computer unit 20 is possible by means of the switching means 18. As a rule, the computer unit is embodied as a microprocessor. Alternatively, a DSP, an ASIC, or other integrated or discretely constructed circuit may also be used.

The method of the invention for detecting blocking of the direct current motor 10 will now be described in conjunction with FIG. 2. This shows a graph, in which the induced voltage U and the motor current I are plotted as a function of the time t. An activation of the direct current motor 10 from the time t=0 onward is effected for instance by switching on the blower. Within the runup phase ($0<t<t_1$) of the direct current motor 10, the motor current I initially increases markedly above a rated motor current value $I_{norm}$, and then at time $t_1$ it drops to the rated motor current value $I_{norm}$. The induced voltage U of the direct current motor 10 in this time segment or "time segment"—different word] increases in proportion to the rpm of the direct current motor 10, up to a maximum voltage value $U_{max}$. Typically, the time period of the runup phase ($0<t<t_1$) of a blower direct current motor is approximately 3 seconds. Depending on the use of the direct current motor 10, however, the runup phase may also be markedly shorter or longer.

Once the runup phase ($0<t<t_1$) ends, the direct current motor 10, at a time $t_2 \geq t_1$ is deactivated by the computer unit 20 with the aid of the switching means 18 for a defined time period $T_{off}$ until a time $t_3$; if blocking is not occurring, the motor current I drops to the value of zero within a few milliseconds—as a rule, within 1 ms. Because a fan, not shown in FIG. 1, of the blower continues to rotate by inertia, the direct current motor 10 maintains approximately the same rpm, so that the induced voltage U drops only slightly.

Within the defined time period $T_{off}$, the induced voltage U of the direct current motor 10 is now measured at least one subsequent time $t_a$ and is forwarded to the computer unit 20 via the two node points 12 and 14. If the measurement—as shown in FIG. 2—shows that the induced voltage U is not undershooting a predetermined threshold value $U_{th}$, then the direct current motor 10 at time $t_3$, that is, after the end of the defined time period $T_{off}$, is reactivated by closure of the switching means 18. Conversely, if the measured, induced voltage U is below the predetermined threshold value $U_{th}$, then the direct current motor 10 remains deactivated even after the defined time period $T_{off}$. However, in FIG. 2, it is assumed that initially no blocking is occurring, so that a reactivation of the direct current motor 10 takes place at time $t_3$. Since the direct current motor 10 at time $t_3$ still has nearly the same rpm as at the beginning of the defined time period $T_{off}$, and thus the induced voltage U has only insignificantly undershot its maximum voltage value $U_{max}$, upon the reactivation of the direct current motor 10 at time $t_3$ only an insignificant increase in the motor current I above the rated motor current value $I_{norm}$ occurs.

Within the defined time period $T_{off}$, the induced voltage U can be measured arbitrarily often. However, since as a rule the defined time period $T_{off}$ lasts for only between 10 and 100 ms, although markedly lower or higher values are entirely possible as well, the measurement of the induced voltage U is typically done at a subsequent time or at relatively few subsequent times. Depending on the outcome, however, many measurement times may also be selected.

After the reactivation of the direct current motor 10 at time $t_3$, or in other words if blocking is not occurring, then during the operation of the direct current motor 10 at a first reference time $t_{ref1} \geq t_3$, the measurement variable $X_{mess}$ in the form of the motor current I is read in by the measuring device 16 and forwarded as a reference value $X_{ref}$ to the computer unit 20 for storage in the memory 22. Following that, at the specified measurement times $t_{m1}$, $t_{2m}$, $t_{m3}$, $t_{m4}$, a measurement in each case of the measurement variable $X_{mess}$ is then effected by the measuring device 16. If for instance because of rough running of the direct current motor 10, the measurement variable $X_{mess}$ (in this case accordingly the motor current I) measured at the measurement time $t_{m4}$ is deviating by more than a predeterminable tolerance value from the reference value $X_{ref}$ stored in memory at the first reference time $t_{ref1}$—that is, in the event that the predeterminable tolerance value is a factor P, the relationship is then for instance $X_{mess} > P \cdot X_{ref}$—then at time $t_4 \geq t_{m4}$, by means of the switching means 18 triggered by the computer unit 20, another deactivation of the direct current motor 10 takes place for the defined time period $T_{off}$. The factor P in the case of measuring the motor current I logically results in P>1, since rough running or blocking of the direct current motor 10 always leads to an increase in the motor current I to above the rated motor current value $I_{norm}$. For the exemplary embodiment shown, a factor P=1.2 is for instance assumed; that is, the maximum motor current I that occurs must not be more than 20% above the rated motor current value $I_{norm}$. Conversely, if not the motor current I but some other value is measured as the measurement variable $X_{mess}$, then it may also be necessary to make the relationship $X_{mess} < P \cdot X_{ref}$ the basis. In that case, the factor is P<1. Alternatively, it is possible to provide the predeterminable tolerance value, instead of in the form of the factor P, as a summand or offset with a positive or negative sign, depending on the measured measurement variable $X_{mess}$.

Within the defined time period $T_{off}$, then at least one subsequent time $t_b$, the induced voltage U of the direct current motor 10 is measured again and forwarded to the computer unit 20 via the two nodes points 12 and 14. If now—as shown in FIG. 2—blocking of the direct current motor 10 is found, since the induced voltage U after the deactivation of the direct current motor 10 has undershot the predetermined threshold value $U_{th}$ at time $t_b$, then the direct current motor remains deactivated even beyond the terminal time $t_5$ of the defined time period $T_{off}$. However, if it proves that the induced voltage U at time $t_b$ is not undershooting the threshold value $U_{th}$, then the direct current motor 10, following the defined time period $T_{off}$, is reactivated at time $t_5$ by the computer unit 20 by means of the switching means 18, and at a second reference time $t_{ref2} \geq t_5$, a new reference value $X_{ref}$ is stored in the memory 22 of the computer unit 20 (not shown in FIG. 2). Next, the described measuring operation is repeated continuously, until a final deactivation of the direct current motor 10 takes place, for instance because of shutoff of the blower or if blocking is detected.

Alternatively to the reference value $X_{ref}$, the reference value multiplied by the factor P, that is, $P \cdot X_{ref}$, can also be stored directly in the memory 22 of the computer unit 20.

Figure 2:
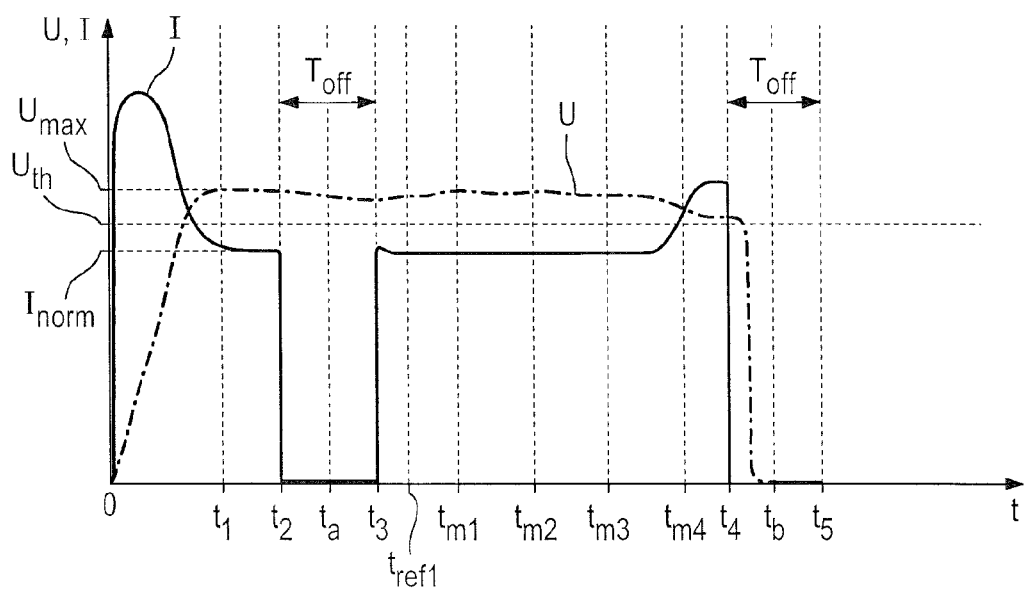
FIG. 2: a graph of the course over time of the induced voltage and the motor current.

For the method of the invention as shown in FIG. 2, it is contemplated that the specified measurement times $t_{m1}$, $t_{m2}$, $t_{m3}$, $t_{m4}$ have regular spacings. For instance, a measurement of the measurement variable $X_{mess}$ can be done every 5 seconds. However, a markedly shorter measurement interval (such as 10 ms) or longer measurement interval (such as 1 minute) may be advantageous, depending on whether it is more important to detect irregularities as quickly as possible, or to lighten the load on the computer unit 20. Alternatively, it is also possible to select the measurement times $t_{m1}$, $t_{m2}$, $t_{m3}$, $t_{m4}$ arbitrarily, or in other words not equidistantly. For instance, it is conceivable, immediately after the reference times $t_{ref1}$, $t_{ref2}$, to select shorter spacings between the measurement times $t_{m1}$, $t_{m2}$, $t_{m3}$ $t_{m4}$, which then with an increasing running time of the direct current motor 10 increase in either linear or nonlinear fashion. Instead of discrete measurement times $t_{m1}$, $t_{m2}$, $t_{m3}$, $t_{m4}$, a continuous measurement of the measurement variable $X_{mess}$ as well as its forwarding to the computer unit 20 can also be done; in that case, the computer unit 20 performs a chronological truncation of the measurement variable $X_{mess}$, for instance at the measurement times $t_{m1}$, $t_{m2}$, $t_{m3}$, $t_{m4}$, for the comparison with the reference value $P \cdot X_{ref}$ that involves tolerances.

In order moreover to be able to take interfering influences on the measuring operation into account, such as fluctuations in the motor supply voltage $U_B$ and/or in an ambient temperature $t_U$, it can furthermore be provided that the reference value $X_{ref}$ be tracked as a function of these variables that affect the motor current I.

In conclusion, it should also be pointed out that the exemplary embodiment shown is limited neither to only FIGS. 1 and 2 nor only to the aforementioned values for the specified measurement times $t_{m1}$, $t_{m2}$, $t_{m3}$, $t_{m4}$, the defined time period $T_{off}$, the duration of the runup phase, the factor P, or other variables mentioned. It is also equally possible for the defined time periods $T_{off}$ that begin at the times $t_2$ and $t_4$ to be selected as being of different lengths, for instance so as to make an optimized adaptation to an altered rpm course of the direct current motor 10 possible.

The invention claimed is:

1. A method for detecting blocking of a direct current motor (10) for a blower of a motor vehicle, comprising the following steps:
   deactivating the direct current motor (10) for a defined time period ($T_{off}$) by a computer unit (20) with the aid of a switching means (18);
   within the defined time period ($T_{off}$), measuring an induced voltage (U) of the direct current motor (10) at least one subsequent time ($t_a$, $t_b$) and forwarding the induced voltage (U) to the computer unit (20);
   maintaining a deactivated state of the direct current motor (10) if the induced voltage (U) undershoots a predetermined threshold value ($U_{th}$), or again activating the direct current motor (10) if the induced voltage (U) of the direct current motor (10) does not undershoot the predetermined threshold value ($U_{th}$);
   after reactivation of the direct current motor (10), forwarding to the computer unit (20) a measurement variable ($X_{mess}$) that is dependent on a motor current (I) and is measured by means of a measuring device (16) and storing said measurement variable ($X_{mess}$) as a reference value ($X_{ref}$) in a memory (22) of the computer unit (20), wherein the measuring device (16) measures the measurement variable ($X_{mess}$) during the operation of the direct current motor (10) and forwards it to the computer unit (20) for a comparison with the reference value ($X_{ref}$) stored in the memory (22); and
   deactivating again the direct current motor (10) by the computer unit (20) with the aid of the switching means (18) for the defined time period ($T_{off}$), if the measured measurement variable ($X_{mess}$) deviates from the reference value ($X_{ref}$) stored beforehand in the memory (22) of the computer unit (20) by more than a definable tolerance value.

2. The method as defined by claim 1, wherein the measuring device (16) measures the measurement variable ($X_{mess}$) during the operation of the direct current motor (10) and forwards it to the computer unit (20) for a comparison with the reference value ($X_{ref}$) stored in the memory (22).

3. The method as defined by claim 2, further comprising deactivating again the direct current motor (10) by the computer unit (20) with the aid of the switching means (18) for the defined time period ($T_{off}$), if the measured measurement variable ($X_{mess}$) deviates from the reference value ($X_{ref}$) stored beforehand in the memory (22) of the computer unit (20) by more than a definable tolerance value, and within the defined time period ($T_{off}$), at a subsequent time ($t_b$), measuring again the induced voltage (U) of the direct current motor (10) and forwarding the induced voltage (U) to the computer unit (20), and wherein the direct current motor (10) remains deactivated if the measured, induced voltage (U) undershoots the predetermined threshold value ($U_{th}$), or the direct current motor (10) is reactivated if the measured, induced voltage (U) does not undershoot the predetermined threshold value ($U_{th}$), so that the measuring operation described can be repeated continuously.

4. The method as defined by claim 3, wherein the definable tolerance value is a factor (P).

5. The method as defined by claim 2, wherein the measurement variable ($X_{mess}$) is measured at specified measurement times ($t_{m1}$, $t_{m2}$, $t_{m3}$, $t_{m4}$) and forwarded to the computer unit (20).

6. The method as defined by claim 5, wherein the specified measurement times ($t_{m1}$, $t_{m2}$, $t_{m3}$, $t_{m4}$) have regular spacings.

7. The method as defined by claim 2, further comprising measuring continuously the measurement variable ($X_{mess}$) and forwarding the measurement variable ($X_{mess}$) to the computer unit (20).

8. The method as defined by claim 2, further comprising tracking the reference value ($X_{ref}$) stored in the memory (22) of the computer unit (20) as a function of an influencing variable affecting the motor current (I).

9. The method as defined by claim 8, wherein the influencing variable effecting the motor current (I) is a motor supply voltage ($U_B$) and/or an ambient temperature ($T_U$).

10. The method as defined by claim 1, further comprising detecting by the computer unit (20) blocking if the induced voltage (U) undershoots the predetermined threshold value ($U_{th}$).

11. An apparatus for detecting blocking of a direct current motor (10) for a blower of a motor vehicle, comprising:
   a switching means (18) for activating or deactivating the direct current motor (10);

a measuring device (16) for measuring a measurement variable ($X_{mess}$); and a computer unit (20) for detecting the blocking with the aid of the measurement variable ($X_{mess}$) and of an additionally measured induced voltage (U) of the direct current motor (10) and for activating or deactivating the direct current motor (10) by means of the switching means (18), wherein said apparatus is configured to perform the method of claim 1.

12. The apparatus as defined by claim 11, wherein the switching means (18) is a MOSFFT.

13. The apparatus as defined by claim 11, wherein the measuring device (16) is a series resistor.

14. A method for detecting blocking of a direct current motor (10) for a blower of a motor vehicle, comprising the following steps:

deactivating the direct current motor (10) for a defined time period ($T_{off}$) by a computer unit (20) with the aid of a switching means (18);

within the defined time period ($T_{off}$), measuring an induced voltage (U) of the direct current motor (10) at least one subsequent time ($t_a$, $t_b$) and forwarding the induced voltage (U) to the computer unit (20);

maintaining a deactivated state of the direct current motor (10) if the induced voltage (U) undershoots a predetermined threshold value ($U_{th}$), or again activating the direct current motor (10) if the induced voltage (U) of the direct current motor (10) does not undershoot the predetermined threshold value ($U_{th}$);

after reactivation of the direct current motor (10), forwarding to the computer unit (20) a measurement variable ($X_{mess}$) that is dependent on a motor current (I) and is measured by means of a measuring device (16) and storing said measurement variable ($X_{mess}$) as a reference value ($X_{ref}$) in a memory (22) of the computer unit (20), wherein the measuring device (16) measures the measurement variable ($X_{mess}$) during the operation of the direct current motor (10) and forwards it to the computer unit (20) for a comparison with the reference value ($X_{ref}$) stored in the memory (22); and deactivating again the direct current motor (10) by the computer unit (20) with the aid of the switching means (18) for the defined time period ($T_{off}$), if the measured measurement variable ($X_{mess}$) deviates from the reference value ($X_{ref}$) stored beforehand in the memory (22) of the computer unit (20) by more than a definable tolerance value, and within the defined time period ($T_{off}$), at a subsequent time ($t_b$), measuring again the induced voltage (U) of the direct current motor (10) and forwarding the induced voltage (U) to the computer unit (20), and wherein the direct current motor (10) remains deactivated if the measured, induced voltage (U) undershoots the predetermined threshold value ($U_{th}$), or the direct current motor (10) is reactivated if the measured, induced voltage (U) does not undershoot the predetermined threshold value ($U_{th}$), so that the measuring operation described can be repeated continuously.

15. A method for detecting blocking of a direct current motor (10) for a blower of a motor vehicle, comprising the following steps:

deactivating the direct current motor (10) for a defined time period ($T_{off}$) by a computer unit (20) with the aid of a switching means (18);

within the defined time period ($T_{off}$), measuring an induced voltage (U) of the direct current motor (10) at least one subsequent time ($t_a$, $t_b$) and forwarding the induced voltage (U) to the computer unit (20);

maintaining a deactivated state of the direct current motor (10) if the induced voltage (U) undershoots a predetermined threshold value ($U_{th}$), or again activating the direct current motor (10) if the induced voltage (U) of the direct current motor (10) does not undershoot the predetermined threshold value ($U_{th}$);

after reactivation of the direct current motor (10), forwarding to the computer unit (20) a measurement variable ($X_{mess}$) that is dependent on a motor current (I) and is measured by means of a measuring device (16) and storing said measurement variable ($X_{mess}$) as a reference value ($X_{ref}$) in a memory (22) of the computer unit (20), wherein the measuring device (16) measures the measurement variable ($X_{mess}$) during the operation of the direct current motor (10) and forwards it to the computer unit (20) for a comparison with the reference value ($X_{ref}$) stored in the memory (22); and deactivating again the direct current motor (10) by the computer unit (20) with the aid of the switching means (18) for the defined time period ($T_{off}$), if the measured measurement variable ($X_{mess}$) deviates from the reference value ($X_{ref}$) stored beforehand in the memory (22) of the computer unit (20) by more than a definable tolerance value, and within the defined time period ($T_{off}$), at a subsequent time ($t_b$), measuring again the induced voltage (U) of the direct current motor (10) and forwarding the induced voltage (U) to the computer unit (20), and wherein the direct current motor (10) remains deactivated if the measured, induced voltage (U) undershoots the predetermined threshold value ($U_{th}$), or the direct current motor (10) is reactivated if the measured, induced voltage (U) does not undershoot the predetermined threshold value ($U_{th}$), so that the measuring operation described can be repeated continuously, wherein the definable tolerance value is a factor (P).

16. A method for detecting blocking of a direct current motor (10) for a blower of a motor vehicle, comprising the following steps:

deactivating the direct current motor (10) for a defined time period ($T_{off}$) by a computer unit (20) with the aid of a switching means (18);

within the defined time period ($T_{off}$), measuring an induced voltage (U) of the direct current motor (10) at least one subsequent time ($t_a$, $t_b$) and forwarding the induced voltage (U) to the computer unit (20);

maintaining a deactivated state of the direct current motor (10) if the induced voltage (U) undershoots a predetermined threshold value ($U_{th}$), or again activating the direct current motor (10) if the induced voltage (U) of the direct current motor (10) does not undershoot the predetermined threshold value ($U_{th}$);

after reactivation of the direct current motor (10), forwarding to the computer unit (20) a measurement variable ($X_{mess}$) that is dependent on a motor current (I) and is measured by means of a measuring device (16) and storing said measurement variable ($X_{mess}$) as a reference value ($X_{ref}$) in a memory (22) of the computer unit (20), wherein the measuring device (16) measures the measurement variable ($X_{mess}$) during the operation of the direct current motor (10) and forwards it to the computer unit (20) for a comparison with the reference value ($X_{ref}$) stored in the memory (22); and deactivating again the direct current motor (10) by the computer unit (20) with the aid of the switching means (18) for the defined time period ($T_{off}$), if the measured measurement variable ($X_{mess}$) deviates from the reference value ($X_{ref}$) stored beforehand in the memory (22)

of the computer unit (20) by more than a definable tolerance value, and within the defined time period ($T_{off}$), at a subsequent time ($t_b$), measuring again the induced voltage (U) of the direct current motor (10) and forwarding the induced voltage (U) to the computer unit (20), and wherein the direct current motor (10) remains deactivated if the measured, induced voltage (U) undershoots the predetermined threshold value ($U_{th}$), or the direct current motor (10) is reactivated if the measured, induced voltage (U) does not undershoot the predetermined threshold value ($U_{th}$), so that the measuring operation described can be repeated continuously; and tracking the reference value ($X_{ref}$) stored in the memory (22) of the computer unit (20) as a function of an influencing variable affecting the motor current (I), wherein the influencing variable effecting the motor current (I) is a motor supply voltage ($U_B$) and/or an ambient temperature ($T_U$).

\* \* \* \* \*